United States Patent
Meis et al.

(10) Patent No.: US 10,450,076 B2
(45) Date of Patent: Oct. 22, 2019

(54) AUTOMATED GALLEY FIRE PROTECTION SYSTEM

(71) Applicant: THE BOEING COMPANY, Chicago, IL (US)

(72) Inventors: Charles Steven Meis, Renton, WA (US); Rachel Meis, Renton, WA (US); Jon Christopher Meis, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 321 days.

(21) Appl. No.: 14/867,867

(22) Filed: Sep. 28, 2015

(65) Prior Publication Data
US 2017/0088272 A1    Mar. 30, 2017

(51) Int. Cl.
| | | |
|---|---|---|
| *B64D 25/00* | (2006.01) | |
| *B64D 11/04* | (2006.01) | |
| *B64D 45/00* | (2006.01) | |
| *A62C 2/00* | (2006.01) | |
| *A62C 2/04* | (2006.01) | |
| *A62C 3/00* | (2006.01) | |
| *A62C 3/08* | (2006.01) | |
| *A62C 3/16* | (2006.01) | |

(Continued)

(52) U.S. Cl.
CPC ............... *B64D 25/00* (2013.01); *A62C 2/00* (2013.01); *A62C 2/04* (2013.01); *A62C 3/00* (2013.01); *A62C 3/08* (2013.01); *A62C 3/16* (2013.01); *B64D 11/04* (2013.01); *B64D 45/00* (2013.01); *F24C 7/08* (2013.01); *H02H 5/00* (2013.01); *B64D 2045/009* (2013.01); *G08B 17/00* (2013.01)

(58) Field of Classification Search
CPC .... A62C 3/07; A62C 3/08; A62C 3/10; A62C 3/16
USPC .............................. 169/45, 46, 62; 244/129.6
See application file for complete search history.

(56) References Cited

U.S. PATENT DOCUMENTS

| | | | | |
|---|---|---|---|---|
| 8,164,436 B2* | 4/2012 | Baird, III | ............... | G08B 25/04 340/12.32 |
| 8,322,658 B2* | 12/2012 | Gershzohn | ............. | G08B 17/00 244/129.2 |

(Continued)

FOREIGN PATENT DOCUMENTS

| | | |
|---|---|---|
| EP | 2505923 A1 | 10/2012 |
| GB | 2407719 A | 5/2005 |

OTHER PUBLICATIONS

European Search Report dated Feb. 23, 2017.

*Primary Examiner* — Viet Le
(74) *Attorney, Agent, or Firm* — Patterson + Sheridan, LLP

(57) ABSTRACT

Aspects of the present disclosure relate to systems and methods for automated fire detection, such as in aircraft galleys, or other areas where power sources may result in fire or smoke. The system includes one or more detectors to monitor for smoke or fire in an aircraft galley. Upon detection of smoke or fire, a signal is sent from the one or more detectors to a controller. In response to the incoming signal, the controller sends a signal to a galley power source. The signal provided to the galley power source ceases the application of power to one or more devices located in the galley, extinguishing the source of the fire or smoke. The controller may also send a notification signal to alert the crew to the potential fire hazard. A method of operation is also disclosed.

19 Claims, 4 Drawing Sheets

(51) Int. Cl.
 *F24C 7/08* (2006.01)
 *H02H 5/00* (2006.01)
 *G08B 17/00* (2006.01)

(56) References Cited

U.S. PATENT DOCUMENTS

2006/0170542 A1    8/2006   Schoor
2011/0170377 A1    7/2011   Legaspi
2014/0252880 A1    9/2014   Seigler
2014/0340216 A1* 11/2014   Puskarich .............. G08B 17/11
                                                    340/539.11

* cited by examiner

AUTOMATED GALLEY FIRE PROTECTION SYSTEM

BACKGROUND

Field

Embodiments of the disclosure generally relate to fire protection.

Description of the Related Art

Commercial aircraft use galleys for preparing food served to passengers during flight. The galley typically uses an oven powered by an electrical power source to heat the food. Galleys may also include devices such as toasters or coffee makers. These electrical items create the potential for an inflight galley fire. Galley fires are one of the most common causes for airline flight interruptions and diversions to alternate airports. Usually galley fires are not a threat to continued safe flight and/or landing of the aircraft, but the fires are very expensive to airline operators because of the diversion and related expenses.

Aircraft cargo compartments are required by Federal Aviation Regulations to have smoke detection systems. Galleys installed in the main passenger cabin, however, may not be classified for carrying cargo and therefore typically are not equipped with a smoke detection or fire extinguishing system. In such cases, it is the responsibility of the flight crew to monitor, detect, and extinguish any smoke or fire that occurs in the galley. Even in aircrafts that have smoke detectors installed proximate to the aircraft galley, it remains the responsibility of the crew to monitor the detectors and extinguish any fire hazards. These responsibilities can be a significant increase to the flight crew workload.

Therefore, there is a need for an improved method and system for monitoring and addressing galley-based fire hazards.

SUMMARY

Aspects of the present disclosure relate to systems and methods for automated fire detection, such as in aircraft galleys, or other areas where power sources may result in fire or smoke. The system includes one or more detectors to monitor for smoke or fire in an aircraft galley. Upon detection of smoke or fire, a signal is sent from the one or more detectors to a controller. In response to the incoming signal, the controller sends a signal to a galley power source. The signal provided to the galley power source ceases the application of power to one or more devices located in the galley, extinguishing the source of the fire or smoke. The controller may also send a notification signal to alert the crew to the potential fire hazard. A method of operation is also disclosed. While aspects of the disclosure may refer to galleys, the use of the disclosed system and methods in other areas of the aircraft where power devices are utilized is also contemplated.

In one aspect, a galley fire protection system comprises at least one detector positioned in an aircraft galley, and a controller that receives signals from the at least one detector. Upon receipt of a signal from the detector indicating the presence of smoke or fire in the galley, the controller is configured to determine which devices within the aircraft galley are receiving power, wherein the determining includes interrogating a galley power source. The controller is also configured to transmit a first signal to an alert device, and transmit a second signal to a galley power source to remove power from one or more of the devices receiving power within the aircraft galley, thereby extinguishing the source of smoke or fire.

In another aspect, a galley fire protection system comprises one or more detectors positioned in an aircraft galley, wherein each of the one or more detectors correspond to and are positioned within close proximity to an electrical device within the aircraft galley. A controller receives signals from the one or more detectors, wherein upon receipt of a signal from the detector indicating the presence of smoke or fire in the galley, the controller is configured to determine which devices within the aircraft galley are generating smoke or fire based upon which of the one or more detectors provides the signal to the controller. The controller is also configured to transmit a first signal to an alert device, and transmit a second signal to a galley power source to remove power from one or more of the devices receiving power within the aircraft galley, thereby extinguishing the source of smoke or fire.

In another aspect, a non-transitory computer readable storage medium is provided. The non-transitory computer readable storage medium includes instructions that, when executed by a computing device, cause the computing device to receive a signal from a detector positioned in or near the aircraft galley. The signal indicates the presence of smoke or fire in the aircraft galley. In response to receiving the signal from the detector, a galley power source is interrogated to determine which devices within the aircraft galley are receiving power; a first signal is transmitted to the galley power source to remove power from one or more devices located within the aircraft galley, and a second signal is transmitted to an alert device to inform an aircraft crew member of the presence of smoke or fire in the aircraft galley.

BRIEF DESCRIPTION OF THE SEVERAL VIEWS OF THE DRAWINGS

FIG. 1 illustrates a schematic plan view of an aircraft, according to one aspect of the disclosure.

FIG. 2 is a detailed view of a galley fire protection system and components integrated therewith, according to one aspect of the disclosure.

FIG. 3 is a flow diagram illustrating a method of extinguishing galley fire hazards, according to one aspect of the disclosure.

FIG. 4 illustrates detector placement in an aircraft galley, according to one aspect of the disclosure.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Aspects of the present disclosure relate to systems and methods for automated fire detection, such as in aircraft galleys. The system includes one or more detectors to monitor for smoke or fire in an aircraft galley. Upon detection of smoke or fire, a signal is sent from the one or more detectors to a controller. In response to the incoming signal, the controller sends a signal to a galley power source. The signal provided to the galley power source ceases the application of power to one or more devices located in the galley, extinguishing the source of the fire or smoke. A method of operation is also disclosed.

Figure 1:
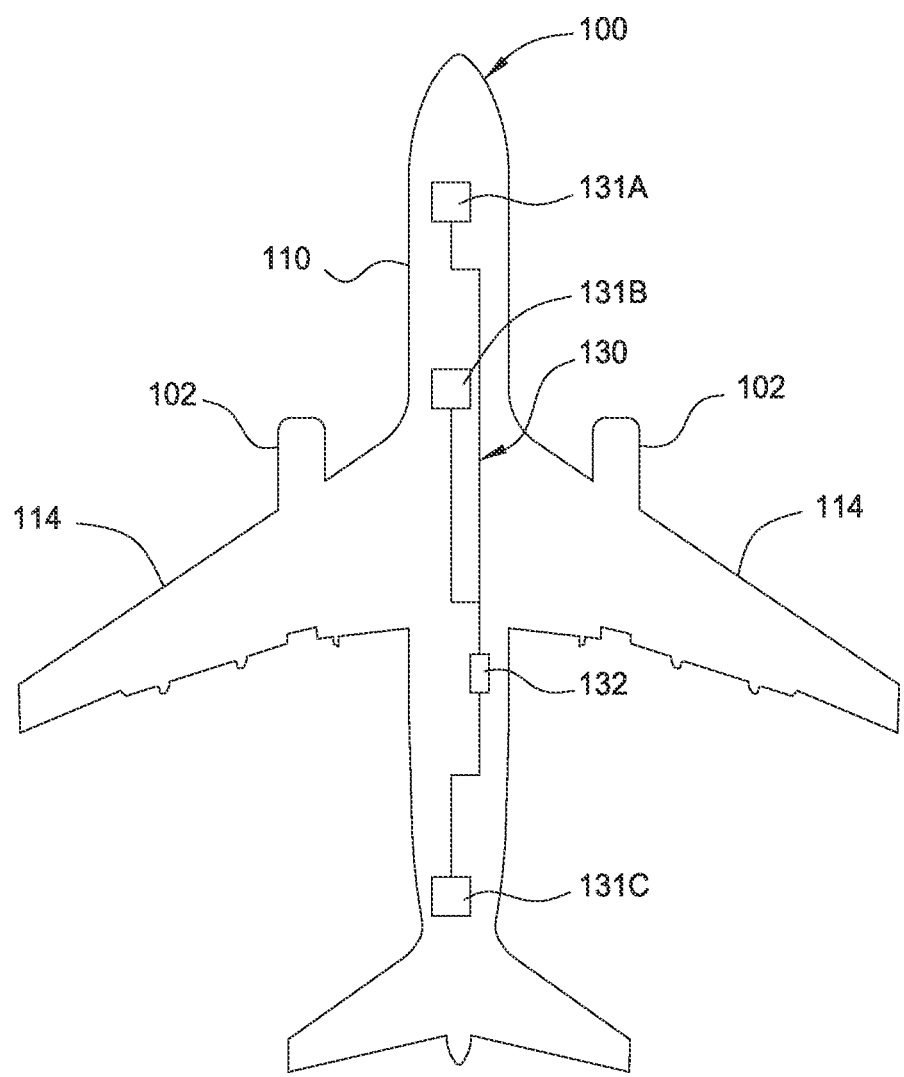
FIGS. 1-4 are presented in this application.

FIG. 1 is a plan view of an aircraft 100 according to one aspect of the disclosure. The aircraft 100 includes a fuselage 110 for holding passengers and/or cargo. Two wings 114, which provide the lift needed to fly the aircraft 100, are coupled to opposite sides of the fuselage 110. Two or more engines 102 (two are shown), which provide the thrust needed to propel the aircraft 100 forward, are coupled to the wings 114.

In one example, the aircraft 100 includes galleys 131A-131C disposed within the fuselage 110 of the aircraft 100. Each of the galleys 131A-131C is equipped with detectors coupled to a controller 132, such as a computing device. While the detectors of each galley 131A-131C are illustrated as being coupled to the same controller 132, it is contemplated that the detectors of each galley 131A-131C may be coupled to a distinct controller 132. Moreover, it is contemplated that the aircraft 100 may contain more or less than three galleys 131A-131C. Each galley 131A-131C may include one or more components of a galley fire protection system of the present disclosure therein. While the controller 132 is illustrated as positioned centrally within the aircraft 100, it is contemplated that the controller 132 may be positioned within other locations. For example, the controller 132 may be positioned in one of the galleys 131A-131C.

Figure 2:
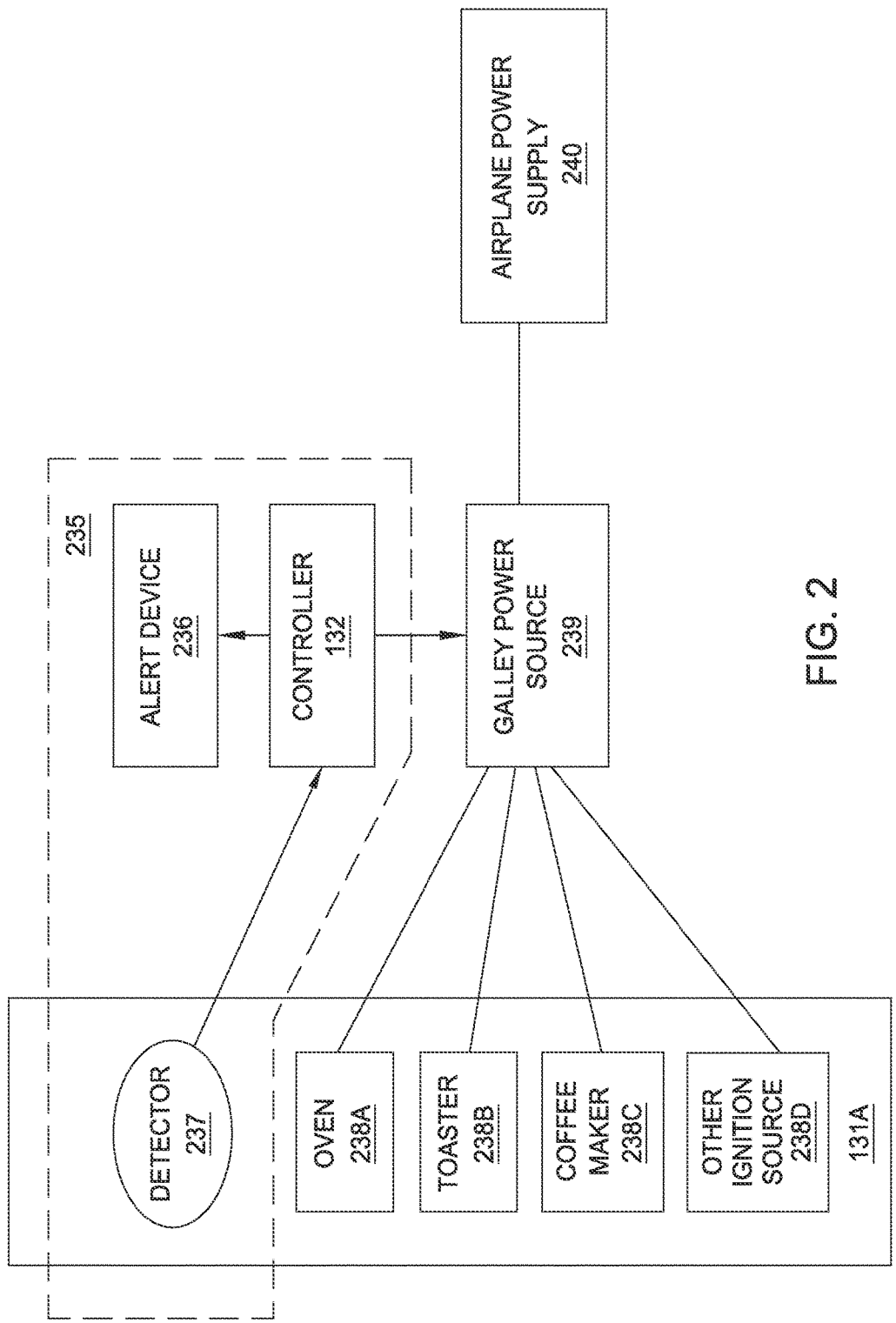

FIG. 2 is a detailed view of the galley fire protection system 235 and components integrated therewith, according to one aspect of the disclosure. The galley fire protection system 235 includes the controller 132, an alert device 236, and a detector 237, such as a fire and/or smoke detector. The detector 237 may be positioned in a galley, such as the galley 131A, to monitor one or more devices 238A-238D. In one example, the one or more devices may include an oven, a toaster, a coffee maker, a power outlet, or other possible ignition sources. Each of the devices 238A-238D is coupled to a galley power source 239, such as a fuse box or relay, that is adapted to provide electrical power received from an aircraft power supply 240, such as a battery or generator, to the devices 238A-238D.

The detector 237 is positioned in the galley 131A within the vicinity of the devices 238A-238D to detect fire, smoke or other combustion byproducts resulting from a fire hazard. The detector 237 may be a photoelectric detector for detecting fire and/or smoke, an ionization detector for detecting fire and/or smoke, or a combination of the two in a common detector housing. Photoelectric detectors sense a difference in optical (light) transmission, which is typically caused by smoke or fire obscuring the light signal between a transmitter and receiver within the photoelectric detector. A photoelectric detector transmits an output alarm signal as soon as the smoke or fire decreases the optical transmission to a predetermined threshold, e.g., 90 percent. Ionization detectors sense the presence of hydrocarbon products of combustion, which may not be optically visible, and therefore, may not trigger a photoelectric detector.

Photoelectric detectors typically respond faster to the presence of visible smoke, whereas ionization detectors typically respond faster to products of combustion which may not be visible but which may actually occur sooner. It is contemplated that a photoelectric detector and an ionization detector located in a common housing may advantageously provide decreased detection times in contrast to conventional approaches. In one aspect, the detector 237 may be installed above or directly adjacent to one of the devices 238A-238D to provide an unobstructed air pathway between the devices 238A-238D and the detector 237. It is contemplated that more than one detector 237 may be utilized. As examples, there can be one or more than one detector for each of the devices 238A-238D.

The detector 237 may be connected to the galley power source 239, or alternatively, may be connected to an independent power supply, such as a dedicated battery. The detector 237 is connected to the controller 132 through a wired connection such as a shared data bus or a separate signal wire. Alternatively, the detector 237 may be connected to the controller 132 via a wireless connection, such as Wi-Fi or Bluetooth. The wireless connection may be used solely to connect the detector 237 to the controller 132, or the wireless connection may be shared within the galley fire protection system 235 or with another system or network on the aircraft 100. In such an aspect, the detector 237 may use an exclusive frequency which does not interfere with the operation of any other systems on the aircraft 100. This frequency could be shared within the galley fire protection system 235, or may be dedicated solely as the connection between the detector 237 and the controller 132, thus minimizing the likelihood of signal interference.

The controller 132 is a federated controller and may be a dedicated "black box" or a card within another aircraft control box, power panel, or the like. In one example, the controller 132 may be located in the electrical/electronic (E/E) equipment bay or in a dedicated location in the main cabin. The controller 132 receives signals from the detector(s) 237 through a wired or wireless connection, as described above. When a signal indicating a fire hazard is received at the controller 132 from the detector 237, the controller 132 transmits a signal to an alert device 236 through either a shared data bus wire, a separate signal wire, or through a wireless signal. If using a wireless signal, it is contemplated that the transmission frequency may be a dedicated frequency or a shared frequency.

Upon receipt of a signal from the detector 237 indicating a potential fire hazard, the controller 132 transmits signals to a galley power source 239 to remove power from the affected devices 238A-238D (e.g., the devices generating the smoke or fire hazard), thus extinguishing the fire hazard. Optionally, the controller may interrogate the galley power source 239 to determine which devices 238A-238D are receiving power in order to identify the source of the fire hazard, and present this information to the crew, for example, via a graphical user interface on the flight deck. The interrogation may include, for example, a measurement of current flow, impedance, or resistance, to one or more devices. In such an example, the controller 132 may remove power from only the affected device 238A-238D, while allowing power to be provided to the non-affected devices 238A-238D. Such interrogation is useful in instances where each device 238A-238D does not corresponding to a distinct detector 237. If each device 238A-238D does correspond to a distinct detector 237, the controller 132 may rely upon the one-to-one correlation of devices to detectors to identify the particular device generating the fire hazard, since each detector may correspond to a particular device.

Depending on the particular power source being used for the galley 131A, the system may use different methods to identify which devices may be a cause of the fire or smoke. In one example the galley power source 239 may be electronically controlled, and in such an example the controller 132 may be coupled to the existing signal wires which trigger the galley power source 239 to provide power each device 238A-238D. In such an example, interrogation may include determining which signal wires are presently facilitating current flow, and referencing an index which includes a reference of the correspondence between particular signal wires and the devices 238A-238D. If the galley power source 239 does not have such a signal wire, then relays, current transformers, or similar devices can be added to the device loads to monitor the power being drawn by each device 238A-238D. These signals may be managed by the galley power source 239 and converted into a single data stream, or each device 238A-238D may transmit a separate signal to the controller 132, which will decode the signals as discrete devices, to facilitate determination of which devices 238A-238D are currently receiving power.

The galley power source 239 may include one or more of a relay, a remote-controlled circuit breaker, a dedicated protection circuit, or similar protector. Receipt of a signal from the controller 132 causes the relay, circuit breaker, or protection circuit to trip, thereby preventing the application of power to one or more devices 238A-238D. Power supply may be halted to a single device detected as the source of the fire/smoke, or power may be halted to all devices. The controller 132 interfaces with the galley power source 239 via a data bus which is shared with the detector 237 and the alert device 236. Alternatively, the controller 132 may interface with the galley power source 239 through a data bus which is shared with another flight system, or a data bus which connects only with the devices 238A-238D. Alternatively, individual signal wires may be utilized rather than a data bus, or signals may be sent wirelessly. The wireless signals may share a standard protocol with one or more other systems on the aircraft 100, or may utilize a protocol only between the devices 238A-238D, the galley power source 239, and the controller 132. In one example, wireless signals may be sent through shared or separate frequencies using a unique protocol to communicate only within the components of FIG. 2.

The controller 132 is also connected to an alert device 236. Subsequent to, prior to, or concurrent with the transmission of a signal from the controller 132 to the galley power source 239 to cease transmission of power to a device 238A-238D, the controller 132 also transmits a signal to the alert device 236. The alert device 236 may be an alarm, display device, or the like, and may be located on the flight deck of the aircraft 100 and/or in the galley. The alert device 236 is intended to alert the crew to the fire condition. The signal to the alert device may be transmitted over an aircraft data bus or a wireless signal, similar to signal transmission methods described above. Exemplary alerts may include one or more of the following: a colored light such as amber or red; a message displayed on a graphical user interface, an aural warning, and the like. In one example, an alert is provided to the alert device 236, but no further action is required on the part of the crew, since the controller 132 removes power from the devices 238A-238D via the galley power source 239, effectively extinguishing the fire hazard, without crew intervention.

The disclosed system allows for a fire in galley equipment to be uniquely isolated at the individual device within the galley. The function of the signals between the devices, the galley power source, and the controller is to remove power immediately from the affected device, thereby extinguishing and preventing any propagation of the fire hazard. Because a fire needs three elements to burn (e.g., fuel, oxygen, and an energy source), removing the energy source extinguishes the fire hazard. Additionally or alternatively, it is contemplated that the system may optionally include an active fire extinguisher, such as a source of water, wet chemical, foam, dry powder, or carbon dioxide to assist in extinguishing the fire or other source of smoke. For example, upon detection of smoke or fire, the controller may additionally send a signal resulting in active extinguishing the fire or source of smoke, in addition to ceasing the application of power to the affected device.

Figure 3:
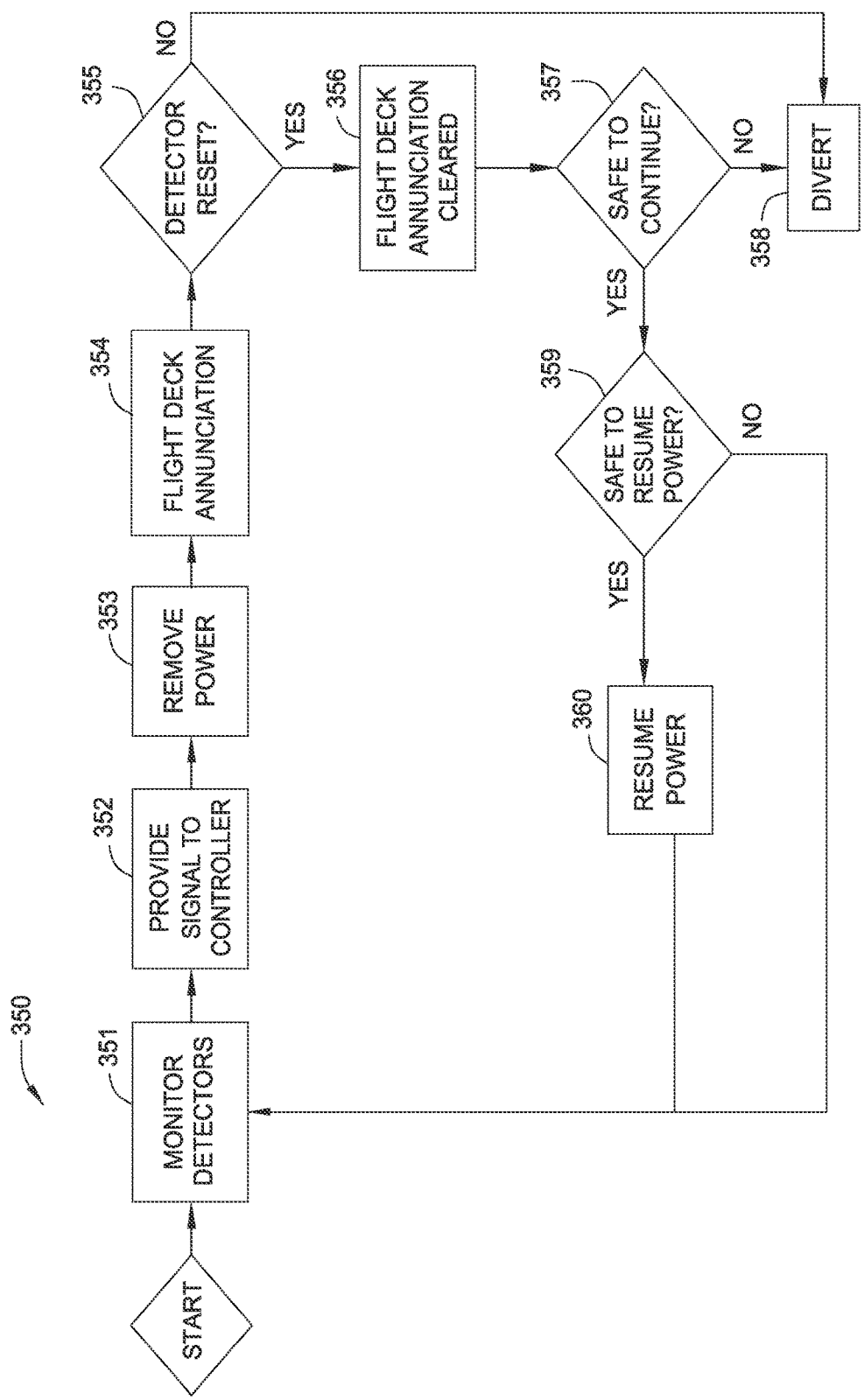

FIG. 3 is a flow diagram illustrating a method 350 of extinguishing galley fire hazards, according to one aspect of the disclosure. To facilitate explanation, FIG. 3 will be explained with reference to FIG. 2. The method 350 begins at operation 351, in which one or more detectors 237 monitor one or more devices 238A-238D for indications of smoke or fire. Upon detection of smoke or fire by the one or more detectors 237, a signal is provided to the controller 132 from the detector 237 in operation 352. In operation 353, the controller 132 removes power from one or more of the devices 238A-238D. Power is removed from the one or more devices 238A-238D by sending an instruction signal form the controller 132 to the galley power source 239. The instruction signal may be transmitted digitally through a data bus between the controller 132 and the galley power source 239. The instruction signal may be transmitted through dedicated signal wires to each of the affected galley devices 238A-238D, or the instruction signal may be transmitted through individual signal wires to a power supply control input corresponding to each of the galley devices 238A-238D. Additionally or alternatively, a single signal wire may be connected to the galley power source 239 and may be adapted to shut off power to the galley 131A entirely. It is contemplated that the instruction signal may be sent wirelessly.

The instruction signal to remove power may share a standard protocol, either with the rest of the galley fire protection system 235, another system on the aircraft 100, or only between the galley devices 238A-238D, the galley power source 239 and the controller 132. The instructions signal may be sent through shared or separate frequencies using a unique protocol to communicate only within the galley fire protection system 235. Upon receipt of the instruction signal, a relay, circuit breaker, or protection circuit of the galley power source 239 trips to prevents the application of power to the one or more devices 238A-238D, including the device generating the smoke or fire. In one example, all of the devices 238A-238D may be coupled to a single galley power source 239, and transmission of the instruction signal to the galley power source 239 results is de-energizing a desired device 238A-238D coupled to the galley power source 239. Alternatively, it is contemplated that each device 238A-238D may be coupled to a separate and dedicated galley power source 239. As discussed above, power application may be prevented to all of the devices 238A-238D coupled to a particular galley power source 239, or to only the device generating the smoke or fire.

In operation 354, a flight deck annunciation or notification is made via an alert device 236. The flight deck annunciation alerts the aircraft crew to the detected fire hazard. After alerting the crew in operation 354, the controller 132 determines whether the one or more detectors 237 have reset due to the fire hazard being extinguished in operation 355. If, after a predetermined amount of time, the detector resets (e.g., a detector reset event occurs), the flight deck annunciation is cleared in operation 356, and method 350 proceeds to operation 357. In operation 357, a crew member makes a determination as to whether the flight is safe to continue as a result of the detected fire hazard. If the flight is not safe to continue, the flight is diverted in operation 358 to address the fire hazard on the ground. Returning to operation 355, if the detector 237 does not reset within a predetermined amount of time, method 350 proceeds directly from operation 355 to operation 358, and the flight is diverted.

If in operation 357 a crew member determines that it is safe to continue the flight, then method 350 proceeds to operation 359. In operation 359, a crew member determines whether it is safe to resume power to the affected device, e.g., the device which triggered the detector 237 in operation 351. If the crew member determines that it is safe to resume power to the device, then method 350 proceeds to operation 360, and power application is resumed. For example, the circuit or relay may be reset manually or via a command to the controller 132. Method 350 then proceeds back to operation 351 for continued monitoring. If a negative determination is made in operation 359, operation 360 is skipped, and method 350 proceeds from operation 359 back to operation 351 for continued monitoring, while the affected device remains inoperable.

Figure 4:
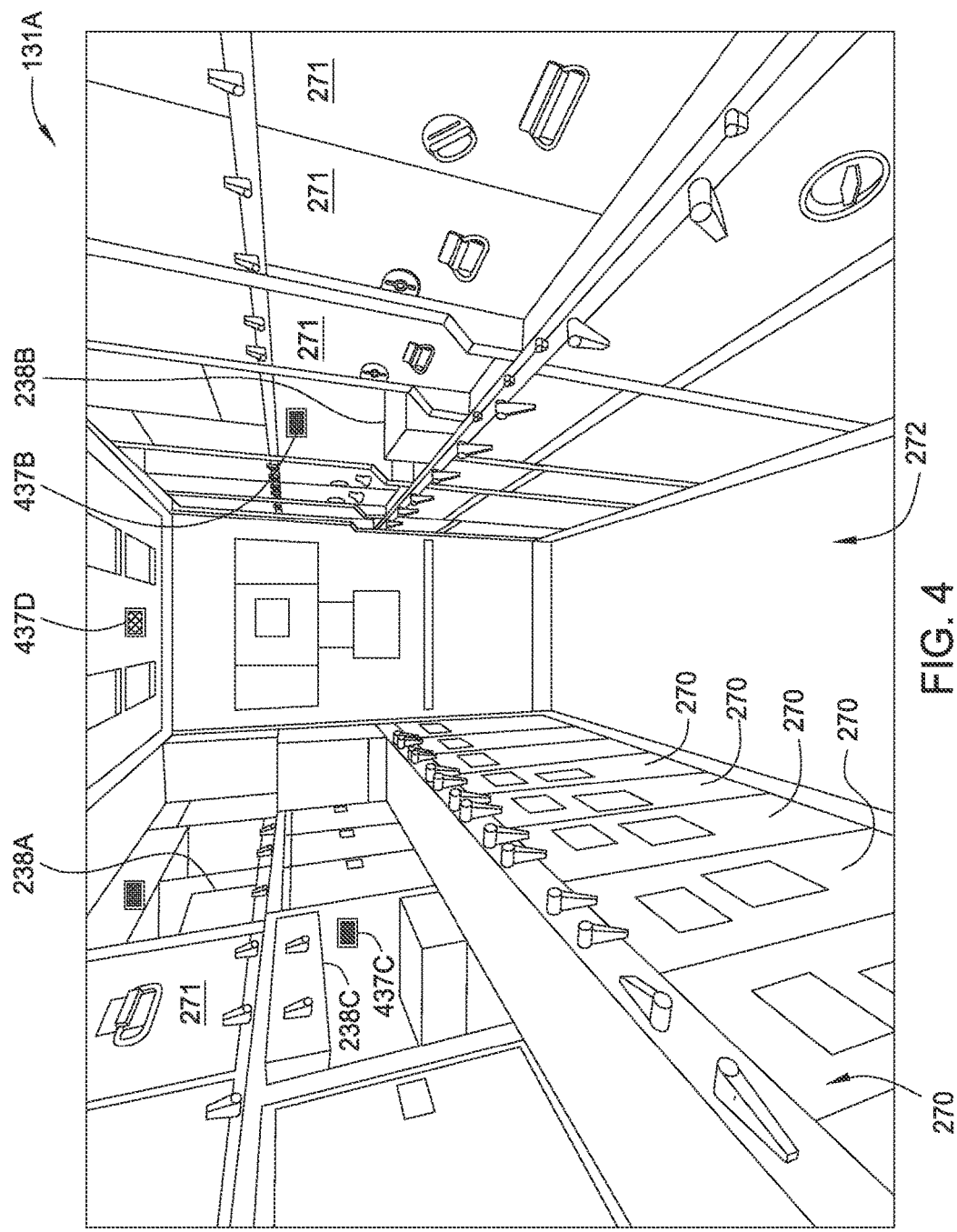

FIG. 4 illustrates detector placement in an aircraft galley 131A, according to one aspect of the disclosure. The aircraft galley 131A is an elongated compartment including one or more carts 270 and cabinets 271 disposed on one or both sides of a walkway 272. One or more devices 238A-238C, such as electronic food or beverage preparation devices, are located within the galley 131A to facilitate preparation of food and beverages for the aircraft 100.

The aircraft galley 131A includes four detectors 437A-437D positioned therein. However, it is to be noted that the aircraft galley 131A may include more or less than four detectors 437A-437D. The detectors 437A-437D can be similar to detectors 237 described above with respect to FIG. 2 or other similar detectors useful for monitoring fire and smoke conditions in an aircraft environment on the ground and at altitude. In the example illustrated in FIG. 4, the detectors 437A-437C are positioned adjacent to devices 238A-238C, respectively. For example, the detectors 437A-437C may be positioned about 3 inches to about 24 inches from the devices 238A-238C. Due to the close proximity of the detectors 437A-437C to the devices 238A-238C, the detectors 437A-437C can quickly detect any signs of fire or smoke generated from the devices 238A-238C, and provide a signal to the controller 132 (shown in FIG. 2) that a fire hazard has been detected. Although the detectors 437A-437C could be positioned further from the devices 238A-238C, the relatively close proximity of the detectors 437A-437C to the devices 238A-238C reduces the detection time. For example, in one aspect of the disclosure detection time may be on the order of 10 seconds to 30 seconds from commencement of the fire hazard. In contrast, conventional approaches may take on the order of several minutes for detection to occur. Upon receipt of the detection signal, the controller 132 may proceed as described above with respect to method 350.

The detector 437D is a global detector located within the galley to detect smoke or fire hazards indiscriminately within the galley 131A, rather than positioned adjacent a specific device 238A-238C. It is contemplated that the galley 131A may include only a single, global detector, such as the detector 437D, and may exclude the detectors 437A-437C. A single detector setup may be advantageous for smaller galleys, or galleys using minimal food or beverage preparation devices. However, the additional or alternative use of the detectors 437A-437C may increase detection and response time in contrast to systems utilizing only a single, global detector due to the relatively closer proximity of the detectors 437A-437C to the devices 238A-238C. Moreover, while FIG. 4 illustrates one example of a galley 131A, it is to be noted that the galley 131A is only one example of a galley configuration, and other configurations are contemplated.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the application makes reference to specific aspects, the scope of the present disclosure is not limited to specific described aspects. Instead, any combination of the above features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the above aspects, features, and advantages are merely illustrative and are not considered elements or limitations of the appended claims except where explicitly recited in claims. Likewise, reference to "the invention" shall not be construed as a generalization of any inventive subject matter disclosed herein and shall not be considered to be an element or limitation of the appended claims except where explicitly recited in the claims.

Aspects of the present disclosure may take the form of an entirely hardware aspect, an entirely software aspect (including firmware, resident software, micro-code, etc.) or an aspect combining software and hardware aspects. Aspects of the disclosure may be embodied in a computer program product. A computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages.

Aspects of the present disclosure are described herein with reference to flowchart illustrations and/or block diagrams of methods, apparatuses, and computer program products according to aspects of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The controller 132 described above is one such computer. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Benefits of the disclosure include automated detection and extinguishing of galley smoke and fire hazards, thereby reducing crew workload in the event of a galley fire. The interrogation and identification of individual galley components by the controller allows for the disabling of power only to components that are presently generating a fire hazard. Moreover, the disclosed system is easily configured to a variety of applications, including aircraft arrangements, without requiring a dedicated crew interface. Instead, the disclosed system may rely on existing crew interfaces, such as flight deck graphical user interfaces.

Additionally, aspects of the disclosure utilize sensitive smoke and/or fire detectors for monitoring galley devices. Due to the sensitivity of the detectors, response time for detecting and extinguishing a galley fire is significantly faster than crew-based detection and extinguishment. In one example, the disclosed system may be able to detect and respond to a fire hazard in several seconds. The rapid response of the automated system provides timely annunciation to the flight crew, and may extinguish a fire before diversion of the aircraft becomes necessary.

While the above aspects are described with respect to aircraft galleys, it is contemplated that similar systems may have applicability to other locations. For example, it is contemplated that the similar systems may be utilized to detect and extinguish fire or sources of smoke in other parts of the aircraft, such as near passenger seat outlets or near other outlets or electronic devices which may be used for inflight entertainment and the like. Additionally, while the disclosure is described with respect to an aircraft galley, it is contemplated that aspects described herein may have applicability to other vehicles, including, but not limited to, trains, ships or other vehicles used for public transportation.

While the foregoing is directed to aspects of the present invention, other and further aspects of the invention may be devised without departing from the basic scope thereof, and the scope thereof is determined by the claims that follow.

What is claimed is:

1. A galley fire protection system, comprising:
   at least one detector positioned in an aircraft galley; and
   a controller that receives signals from the at least one detector, wherein upon receipt of a signal from the detector indicating the presence of fire or smoke in the galley, the controller is configured to:
      determine which devices within the aircraft galley are receiving power, the determining including interrogating a galley power source;
      transmit a first signal to an alert device; and
      transmit a second signal to a galley power source to remove power from one or more of the devices receiving power within the aircraft galley, thereby extinguishing the source of the fire or the smoke.

2. The galley fire protection system of claim 1, wherein the alert device is located within a flight deck of an aircraft.

3. The galley fire protection system of claim 1, wherein the at least one detector is a plurality of detectors, and each detector of the plurality of detectors is positioned adjacent to a food or beverage preparation device within the aircraft galley.

4. The galley fire protection system of claim 1, wherein the at least one detector is a single, centrally-located detector within the aircraft galley.

5. The galley fire protection system of claim 1, wherein the controller is connected to a second detector positioned in a second aircraft galley.

6. The galley fire protection system of claim 1, wherein the detector comprises a photoelectric detector.

7. The galley fire protection system of claim 1, wherein the detector comprises an ionization detector.

8. The galley fire protection system of claim 1, wherein the detector comprises a photoelectric detector and an ionization detector located in a common detector housing.

9. The galley fire protection system of claim 1, wherein the controller is connected to the at least one detector by a wireless signal.

10. The galley fire protection system of claim 1, wherein the controller is connected to the at least one detector by a wired signal.

11. A galley fire protection system, comprising:
one or more detectors positioned in an aircraft galley, wherein each of the one or more detectors correspond to and are positioned within close proximity to an electrical device within the aircraft galley; and
a controller that receives signals from the one or more detectors, wherein upon receipt of a signal from the one or more detectors indicating the presence of fire or smoke in the galley, the controller is configured to:
determine which devices within the aircraft galley are generating the fire or the smoke based upon which of the one or more detectors provides the signal to the controller, wherein interrogating a galley power source is used to determine which devices within the aircraft galley are receiving power;
transmit a first signal to an alert device; and
transmit a second signal to a galley power source to remove power from one or more of the devices receiving power within the aircraft galley, thereby extinguishing the source of the fire or the smoke.

12. The galley fire protection system of claim 11, wherein the alert device is located within a flight deck of an aircraft.

13. The galley fire protection system of claim 11, wherein the one or more detectors comprises a photoelectric detector.

14. The galley fire protection system of claim 11, wherein the one or more detectors comprises an ionization detector.

15. The galley fire protection system of claim 11, wherein the one or more detectors comprises a photoelectric detector and an ionization detector located in a common detector housing.

16. The galley fire protection system of claim 11, wherein the controller is connected to the one or more detectors by a wireless signal.

17. The galley fire protection system of claim 11, wherein the controller is connected to the one or more detectors by a wired signal.

18. A method of extinguishing a fire hazard in an aircraft galley, comprising:
receiving, at a controller, a signal from a detector positioned in the aircraft galley, the signal indicating the presence of smoke or fire in or near the aircraft galley;
in response to receiving the signal from the detector:
interrogating a galley power source to determine which devices within the aircraft galley are receiving power;
transmitting a first signal to the galley power source to remove power from one or more devices located within the aircraft galley; and
transmitting a second signal to an alert device to inform an aircraft crew member of the presence of smoke or fire in the aircraft galley.

19. The method of claim 18, wherein the galley power source includes a relay or circuit breaker, and sending the first signal to the galley power source causes the relay or circuit to trip.

* * * * *